June 9, 1936.  P. L. ALLARD  2,043,876
SAW SET
Filed Feb. 19, 1935
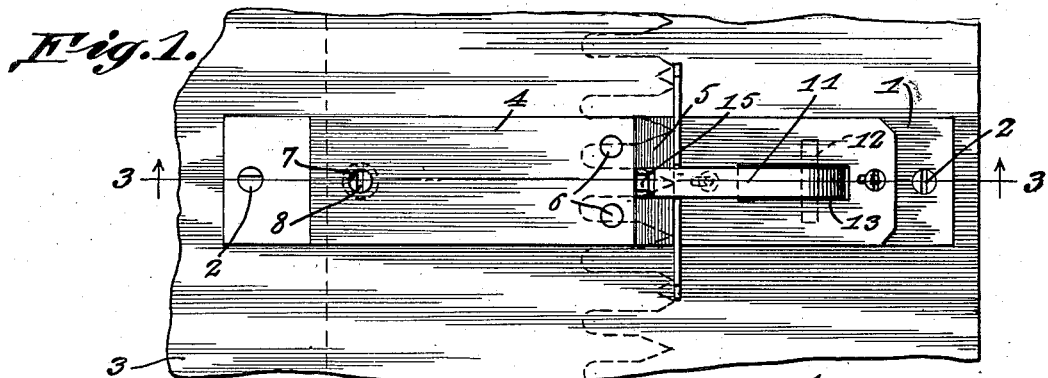
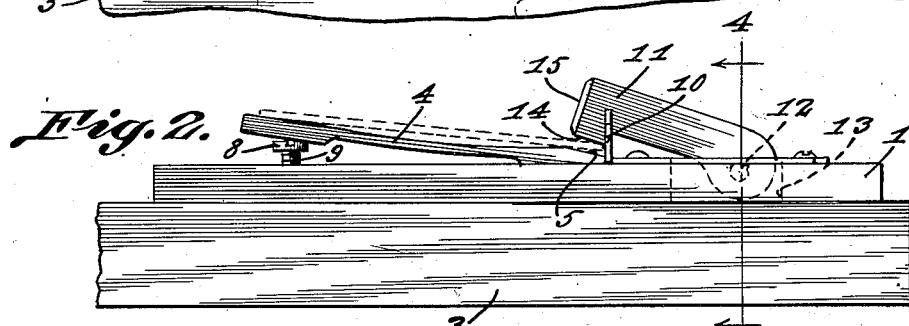
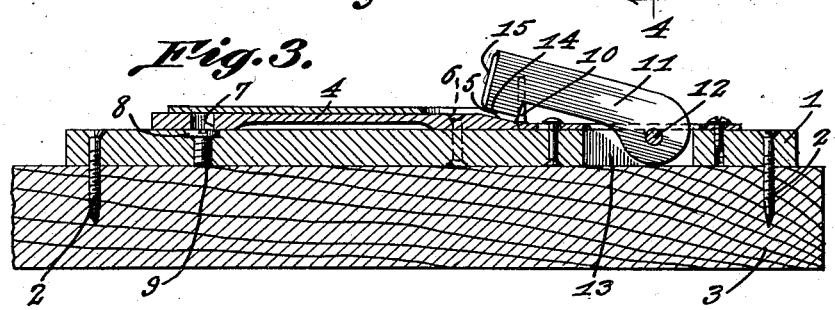
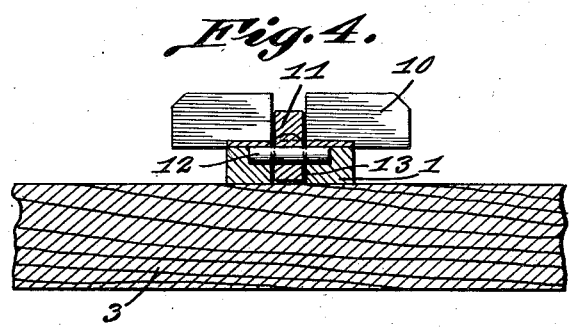
Peter L. Allard, INVENTOR
BY Victor J. Evans & Co.
ATTORNEY Patented June 9, 1936

2,043,876

UNITED STATES PATENT OFFICE 2,043,876

SAW SET

Peter L. Allard, Hovland, Minn.

Application February 19, 1935, Serial No. 7,279

1 Claim. (Cl. 76—73)

This invention relates to saw sets and has for the primary object the provision of a device of this character which will be convenient and easy to operate and includes an adjustable anvil having a pivotally mounted tooth setting hammer operating therewith whereby teeth of a saw may be accurately set to a desired pitch.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a saw set constructed in accordance with my invention.

Figure 2 is a side elevation illustrating the same.

Figure 3 is a sectional view taken on the line 3—3 of Figure 1.

Figure 4 is a transverse sectional view taken on the line 4—4 of Figure 2.

Referring in detail to the drawing, the numeral 1 indicates an elongated base apertured adjacent its ends to receive fasteners 2 for securing the base to a suitable support 3.

Occupying a position upon the base 1 is an anvil 5 provided with a beveled face against which the teeth of a saw are bent in the setting of the teeth at a desired pitch. The anvil 5 is riveted or otherwise secured to the base, as shown at 6. Integral with the anvil 5 is a flexible saw blade rest 4 of elongated formation and is provided with an opening 7 which overlies the head 8 of a set bolt 9 threaded to the base. The head 8 is slotted to receive a screw driver or like tool by being passed through the opening 7 and by turning the set bolt 9 in one direction the rest may be flexed upwardly and by turning the set bolt in an opposite direction, the rest will be permitted to move towards a normal or non-flexed position.

Operating in conjunction with the beveled face is a gauge 10 adjustably secured to the base 1. The gauge may be moved towards and from the beveled face 5 and in operation the saw teeth are brought into engagement with the gauge to properly position the teeth with respect to the beveled face 5.

A tooth setting hammer 11 is pivoted to the base, as shown at 12, and operates through a slot 13 formed in the gauge. The hammer 11 at one end is provided with a striking face 14 and a beveled free end 15. After a tooth of the saw has been positioned properly with respect to the beveled face 5, the hammer 11 is brought into engagement with the tooth and struck a blow, bending the tooth to a proper pitch. The striking face 14 may remain in engagement with the beveled face 5 when the saw is removed from the anvil and when a saw is brought into position on the anvil the teeth thereof engaging the beveled end 15 will cause a slight upward pivotal movement of the hammer sufficient to permit a tooth to move under the striking face 14 of said hammer.

Having described the invention, I claim:

A saw set comprising a base, an anvil secured to said base and provided with a beveled face to be overlied by a tooth of a saw, a gauge adjustably secured to the base to be engaged by teeth of the saw, a hammer pivoted to the base to be brought in engagement with the tooth of the saw positioned over the beveled face of the anvil and adapted to be struck a blow for bending the tooth in engagement with the beveled face of said base, said hammer having a striking face and a beveled end, a flexible saw blade rest integral with the anvil and having an opening, and an adjusting means threaded to the base and underlying said opening for rotation in either direction to flex the rest into various positions.

PETER L. ALLARD.